US010280983B2

(12) United States Patent
Scheufler et al.

(10) Patent No.: US 10,280,983 B2
(45) Date of Patent: May 7, 2019

(54) SHAFT-HUB CONNECTION OF A DOUBLE GEAR ON A TRANSMISSION SHAFT

(71) Applicant: ZF Friedrichshafen AG, Friedrichshafen (DE)

(72) Inventors: Maximilian Scheufler, Salem (DE); Stefan Renner, Bodman-Ludwigshafen (DE)

(73) Assignee: ZF Friedrichsafen AG, Friedrichshafen (DE)

( * ) Notice: Subject to any disclaimer, the term of this patent is extended or adjusted under 35 U.S.C. 154(b) by 0 days.

(21) Appl. No.: 15/522,469

(22) PCT Filed: Oct. 19, 2015

(86) PCT No.: PCT/EP2015/074096
§ 371 (c)(1),
(2) Date: Apr. 27, 2017

(87) PCT Pub. No.: WO2016/078848
PCT Pub. Date: May 26, 2016

(65) Prior Publication Data
US 2017/0343048 A1  Nov. 30, 2017

(30) Foreign Application Priority Data

Nov. 18, 2014 (DE) ........................ 10 2014 223 505

(51) Int. Cl.
*F16D 1/08* (2006.01)
*F16H 57/00* (2012.01)
*F16D 1/068* (2006.01)

(52) U.S. Cl.
CPC ........... *F16D 1/0858* (2013.01); *F16D 1/068* (2013.01); *F16H 57/0025* (2013.01); *F16D 1/0894* (2013.01)

(58) Field of Classification Search
CPC ...... F16D 1/068; F16D 1/0858; F16D 1/0894; F16H 57/0025; Y10T 29/49465
See application file for complete search history.

(56) References Cited

U.S. PATENT DOCUMENTS 2,616,159 A    11/1952 Curtis
4,688,441 A *  8/1987 Yasukawa ............... F16H 55/18
                                            74/409

(Continued)

FOREIGN PATENT DOCUMENTS

DE      922 096       11/1954
DE      4141818 A1    7/1993

(Continued)

OTHER PUBLICATIONS

Machine Translation of DE 19620330 (Year: 1997).*

(Continued)

*Primary Examiner* — William Kelleher
*Assistant Examiner* — Bobby Rushing, Jr.
(74) *Attorney, Agent, or Firm* — Davis & Bujold PLLC; Michael J. Bujold

(57) ABSTRACT

A shaft-hub connection of a double gearwheel (2) on a transmission shaft (5), in which the double gearwheel (2) has a first gearwheel (3) and a second gearwheel (4), which are connected to one another in a rotationally fixed manner. The shaft-hub connection is in the form of a shrink fit (7) between a hub (8) of the first gearwheel (3) and the transmission shaft (5). A maximum of the torque to be transmitted can be transmitted by virtue of the shrink fit (7).

11 Claims, 2 Drawing Sheets

(56) References Cited

U.S. PATENT DOCUMENTS

| | | | |
|---|---|---|---|
| 4,747,321 A * | 5/1988 | Hannel | F16H 55/18 74/409 |
| 5,302,046 A | 4/1994 | Mathes | |
| 6,553,868 B2 | 4/2003 | Takenaka et al. | |
| 6,951,150 B2 * | 10/2005 | Hedman | F16D 1/08 403/279 |
| 7,752,937 B1 * | 7/2010 | Dornan | F16H 55/18 74/409 |
| 8,621,951 B2 * | 1/2014 | Meier | F16D 1/116 74/409 |
| 2006/0251472 A1 | 11/2006 | Stauber | |
| 2008/0141811 A1 * | 6/2008 | Sandner | F16H 55/18 74/434 |
| 2010/0092237 A1 | 4/2010 | Hardtle | |
| 2014/0245584 A1 * | 9/2014 | Wallace | F16B 2/00 29/428 |

FOREIGN PATENT DOCUMENTS

| | | | |
|---|---|---|---|
| DE | 4204814 A1 * | 8/1993 | F16D 1/06 |
| DE | 196 20 330 A1 | 11/1997 | |
| DE | 199 45 097 A1 | 3/2001 | |
| DE | 101 44 915 A1 | 6/2002 | |
| DE | 103 19 629 A1 | 11/2004 | |
| DE | 10 2006 052 104 A1 | 5/2008 | |
| DE | 10 2012 006 633 A1 | 10/2013 | |

OTHER PUBLICATIONS

German Search Report Corresponding to 10 2014 223 505.7 dated Sep. 4, 2015.
International Search Report Corresponding to PCT/EP2015/074096 dated Jan. 21, 2016.
Written Opinion Corresponding to PCT/EP2015/074096 dated Jan. 21, 2016.

* cited by examiner

SHAFT-HUB CONNECTION OF A DOUBLE GEAR ON A TRANSMISSION SHAFT

This application is a National Stage completion of PCT/EP2015/074096 filed Oct. 19, 2015, which claims priority from German patent application serial no. 10 2014 223 505.7 filed Nov. 18, 2014.

FIELD OF THE INVENTION

The present invention concerns a permanent shaft-hub connection of a double gearwheel on a transmission shaft and a transmission shaft arrangement.

BACKGROUND OF THE INVENTION

Torque-transmitting transmission shafts with gearwheels arranged on them are very commonly used in the construction of transmissions. There are many possible ways to fix the gearwheels on the transmission shaft. Particularly well known are positive-locking shaft-hub connections such as the spline shaft connection, the notched-tooth connection, the involute profile connection, the polygonal profile connection, the keyed connection and the pin connection.

In addition there are friction-force-locking shaft-hub connections such as the press-fit and shrink-fit connections. A connection of a gearwheel to a rotating shaft for the transmission of torque by means of a shrink fit without any additional positive-locking component, be it a keyway, a driving tooth array or a pin, is used not only in transmissions for motor vehicles but quite generally in very many machines.

Furthermore, material-merged connections such as welded, soldered or adhesively bonded connections are also known.

Finally, there are also combined shaft-hub connections. These include non material-merged shaft-hub connections such as the press-knurled connection and the press-point connection, as well as partial material-merged combined shaft-hub connections such as the press-adhesive connection, the press-brazed connection and the press-welded connection.

Furthermore, the soldered-welded connection is known as a material-merged combined shaft-hub connection.

In DE 196 20 330 A1 it is proposed to connect a gearwheel to a shaft by means of a shrink fit and, in addition, to fix it by means of a positive-locking connection to prevent movements. In this context the positive-locking connection can be a pin connection with the pin either engaging partially in the shaft or extending completely through it.

Moreover, from DE 10319629 A1 a shaft-hub connection is known, in which two gearwheels arranged directly adjacent to one another are fixed onto a shaft by means of a shrink fit, with the two gearwheels partially overlapping and being connected to one another by a shrink fit. With such a shaft-hub connection, the torque transmission ability is increased compared with two gearwheels fixed on a shaft separately from one another, each by a shrink fit.

Furthermore, from DE 10144915 A1 a double gearwheel consisting of two gearwheels connected to one another in a rotationally fixed manner is known, which is arranged on a shaft by means of a so-termed toothed-wheel supporting structure. In this case a first gearwheel having an axially extending hub section engages with the shaft, and is adapted thereto in a centering manner with a rotation-preventing, positive-locking section and a first fitting section, which are formed in different positions.

SUMMARY OF THE INVENTION

The purpose of the present invention is to indicate a further improved shaft-hub connection for connecting two gearwheels arranged next to one another with a transmission shaft, and a corresponding transmission shaft arrangement.

This objective is achieved by a shaft-hub connection and a transmission shaft arrangement according to the independent claims. Further advantages and advantageous design features emerge from the subordinate claims.

A shaft-hub connection of a double gearwheel on a transmission shaft is proposed, in which the double gearwheel consists of a first gearwheel and a second gearwheel. The first and second gearwheels are connected to one another in a rotationally fixed manner. In this case the first and second gearwheels are produced separately from one another and only joined together in a subsequent assembly step. Compared with double gearwheels made integrally as one-piece, this double gearwheel structure has the advantage that even gear-teeth of the two gearwheels positioned axially very close to one another can still be machined economically.

According to the invention, the shaft-hub connection is in the form of a shrink fit between a hub of the first gearwheel and the transmission shaft, such that by means of this shrink fit a maximum torque to be transmitted can be transmitted. That is to say, in a first simple form of the invention the one shrink fit between the hub and the first gearwheel is the only connection between the double gearwheel and the transmission shaft. Thus, the second gearwheel or a hub of the second gearwheel is not in contact with the transmission shaft. Instead, the second gearwheel is exclusively attached to the first gearwheel and is only connected to the transmission shaft by way of the first gearwheel.

In other words, in the proposed shaft-hub connection the whole of the torque to be transmitted is transmitted only by way of the shrink fit. Such a shrink fit is also called a shrink pressure joint. The shrink fit extends in the axial direction at most over the length of the hub of the first gearwheel Thus the total necessary structural length of the shaft-hub connection can be reduced to a minimum since for the two gearwheels, instead of two shaft-hub connections arranged next to one another only one shrink fit is needed. In this document the directional terms "axial" or "radial" refer to the rotational axis of the transmission shaft.

Those with knowledge of the field are able, by known calculation methods, to design a shrink fit in such manner that it can transmit a certain maximum torque. In particular by the selection of suitable parameters of the shrink fit such as its length and the oversize of the press fit in the shrink fit area, such a person can design the shrink fit for a required maximum torque. In designing the shrink fit, moreover, a knowledgeable person can take into account the frictional coefficients of the surfaces at the shrink fit, the material properties of the hub and the transmission shaft, and additional loads such as axial forces.

By designing the shrink fit in such manner that the maximum torque to be transmitted by the double gearwheel to the transmission shaft during operation can be transmitted by the shrink fit alone, it is basically possible to dispense with further torque-transmitting elements. In many applications it can be assumed that in each case only one of the two sets of teeth or gearwheels at a time will be transmitting a torque. In this way, measured in terms of the maximum applied torque and the maximum structural space used an optimum shrink fit security is obtained. However, applications or operational phases are also conceivable in which, for a time, torque is transmitted by the first and second gearwheels at the same time. In such a case the torque is transmitted by the connection between the two gearwheels, for example a weld joint.

Accordingly, the transmission of torque from the second gearwheel to the transmission shaft necessarily also takes place by way of the hub of the first gearwheel and the shrink fit. For that reason the second gearwheel is preferably connected to the first gearwheel in a positive-locked, friction-force-locked or material-merged manner.

In principle, in the context of the present invention the second gearwheel can be arranged relative to the first gearwheel in several positions. For example, the second gearwheel can be fixed on the hub of the first gearwheel so that the hub of the first gearwheel is radially inside the hub of the second gearwheel. In this way a shaft-hub connection which is particularly space-saving in the axial direction can be produced.

Depending on the structure of the rest of the transmission and on the manufacturing conditions and options, the hub of the second gearwheel can also be arranged next to the hub of the first gearwheel in the axial direction. With such a design an inside bore of the hub of the second gearwheel makes no contact with the transmission shaft. This has the further advantage that compared with shaft-hub connections in which two gearwheel hubs are shrink-fitted onto a transmission shaft, the inside bore of the hub of the second gearwheel does not have to be machined, or at least not so carefully.

In the last-described arrangement in which the first and second gearwheels are arranged next to one another in the axial direction, the respective ends of the hub of the first gearwheel and of the hub of the second gearwheel facing toward one another are preferably welded to one another.

To prevent micro-displacements between the double gearwheel and the transmission shaft, in the area of the shrink fit a positive-locking element can be provided. Such a positive-locking element provided in addition to the shrink fit does not serve to increase the maximum torque that can be transmitted, but rather, only to prevent micro-displacements. Micro-displacements can occur in certain applications, and are often caused by load peaks. In such cases the shaft-hub connection provided cannot totally prevent movements of the gearwheel on the shaft in the circumferential direction. Particularly in transmissions, in which exact alignment of the teeth of various gearwheels with one another play a decisive role, it is essential to prevent such micro-displacements of the gearwheels on the shaft. This is especially important in transmissions with a load distribution between two or more countershafts since in such cases absolute positional accuracy is an indispensable prerequisite for the overall life of the transmission. By arranging the positive-locking element in the area of the shrink fit, i.e. within the extension of the shrink fit in the axial direction, the structural space required remains small so that the transmission as a whole can also be made very compact.

The positive-locking element is preferably a dowel pin. Compared with other types of connection such as weld joints or a keyway connection, a dowel pin can be used with less risk of position errors.

The shrink fit of the shaft-hub connection claimed can even have a plurality of shrink fit sections along its axial length, with different press fit amounts in the shrink fit sections. In this way, after the shrinking process different surface pressures are produced, which ultimately determine different torque transmission abilities in the shrink fit sections. The various surface pressures can be produced by an appropriate choice of corresponding oversizes of the respective press fits in the individual shrink fit sections.

Owing to the shrinking of the double gearwheel onto the transmission shaft shrinkage stresses are produced, which during operation are superimposed on the root stresses of the teeth of the first gearwheel so that in the shrink-fit area a multi-axial stress situation can arise. In the worst case this multi-axial stress situation can result in fracture of one or more gearteeth. For that reason it is advantageous to provide a first shrink fit section axially in the area of the teeth of the first gearwheel such that this first shrink fit section has a lower surface pressure than the other axial shrink fit section(s), so that the shrinkage stresses are lower in the first axial shrink fit section. Thus, by reducing the shrinkage stresses in the first axial shrink fit section damage to the teeth caused by superposition of stresses is prevented.

Finally, the present invention also includes a transmission shaft arrangement with at least a first gearwheel and a second gearwheel, which are fixed onto the transmission shaft by a shaft-hub connection as described above.

For example, the shaft-hub connection for fixing a double gearwheel onto a countershaft is used in a vehicle transmission. Particularly for vehicle transmissions in which the power flow is split and transmitted by way of two countershafts, the shaft-hub connection can be used to good advantage. In such cases strict demands are made on the positional accuracy and concentricity of the two gearwheels relative to one another and to the associated transmission shaft. With a double gearwheel for the shaft-hub connection according to the invention described here, the larger of the two gears can be ground positionally accurately relative to the smaller gear after the double gearwheel has been joined to the transmission shaft. Owing to the larger diameter of the larger gearwheel, its teeth can be ground with large grinding disks or grinding worms as economically as can be done with individual gearwheels.

BRIEF DESCRIPTION OF THE DRAWINGS

Below, the invention is explained in more detail with reference to the example embodiment illustrated in the figures, which show.

DETAILED DESCRIPTION OF THE PREFERRED EMBODIMENTS

Figure 1:
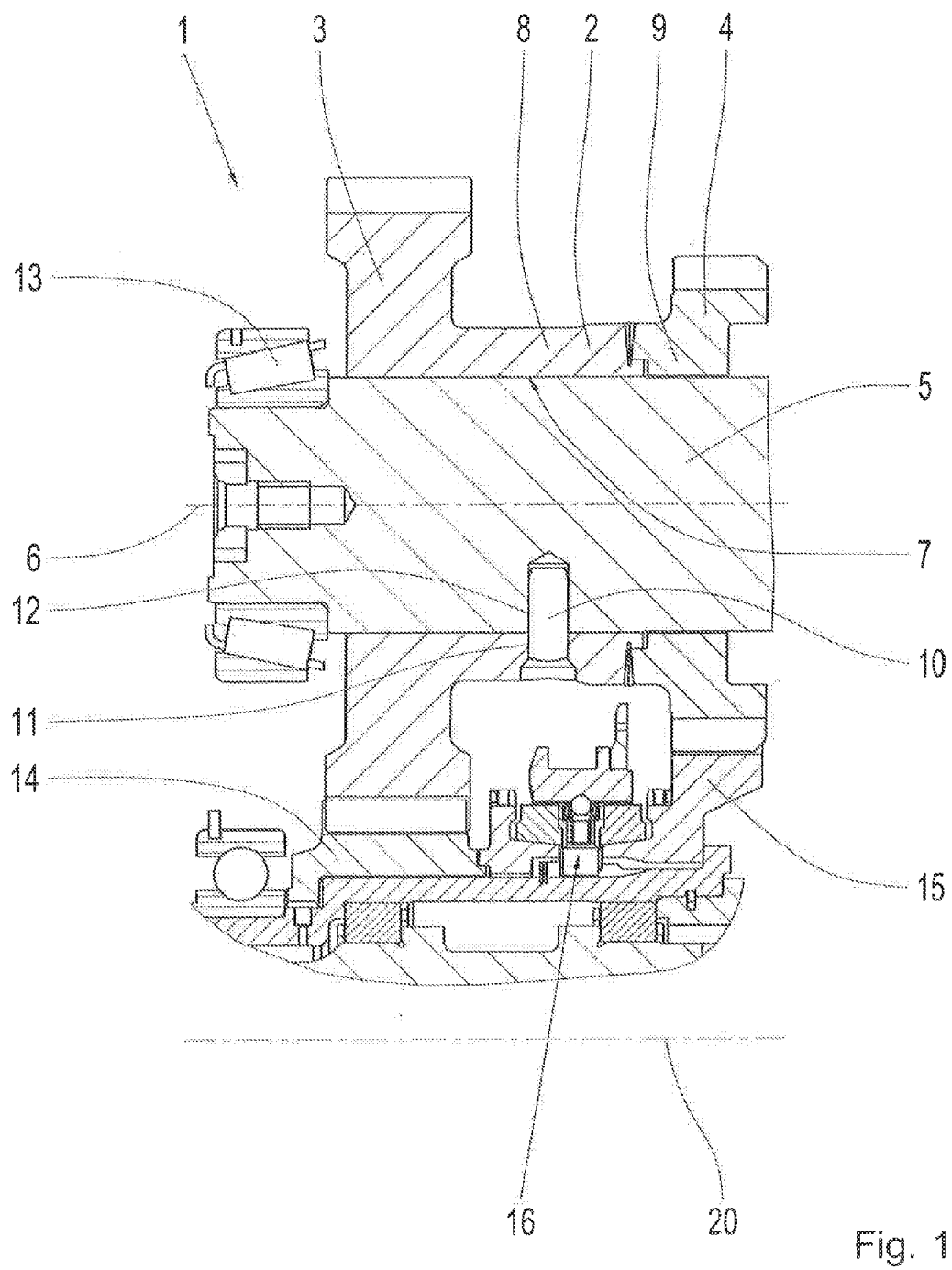
FIG. 1: A transmission shaft arrangement with a shaft-hub connection according to the invention.

FIG. 1 shows the end area of a transmission shaft 5, which can rotate about a rotational axis 6. For this, the transmission shaft 5 can be mounted in a transmission housing (not shown), among other things by means of a roller bearing 13.

A double gearwheel 2 is fixed onto the transmission shaft 5 by means of a shaft-hub connection. The double gearwheel 2 consists of a first gearwheel 3 and a second gearwheel 4, which are joined to one another in a rotationally fixed manner. The first gearwheel 3 and the second gearwheel 4 are arranged next to one another in the axial direction, so that a hub 9 of the second gearwheel 4 is axially next to the hub 8 of the first gearwheel 3.

The rotationally fixed connection between the first gearwheel 3 and the second gearwheel 4 is produced in this example embodiment by welding the two gearwheels 3 and 4 to one another. For this purpose, the end faces of the hub 8 of the first gearwheel 4 and of the hub 9 of the second gearwheel 4 facing toward one another are welded together.

The shaft-hub connection is formed as a shrink fit 7 between the hub 8 of the first gearwheel 3 and the transmission shaft 5. The shrink fit 7 is designed in such a way that a maximum torque to be transmitted can be transmitted by way of the shrink fit 7. To ensure a required shrink fit security and torque transmission ability of the shrink fit, in advance suitable parameters such as shrink fit length and oversize at the shrink fit site are calculated and determined. For this, in addition to the torque load data, additional loads such as axial loads that occur during operation are taken into account. Furthermore, for this purpose a knowledgeable person will have chosen suitable materials for the gearwheels and the transmission shaft, as well as surface properties at the shrink fit surfaces of the gearwheel hub and the transmission shaft.

To prevent micro-displacements a dowel pin 10 is provided in the area of the shrink fit 7. The dowel pin extends from a through-going bore 11 in the hub 8 of the first gearwheel 3 into a blind bore 12 in the transmission shaft 5, and in that way secures the position of the double gearwheel 2 on the transmission shaft 5, even during load peaks in long-term operation, without transmitting any torque during normal operation.

FIG. 1 also shows partial views of a third gearwheel 14 and a fourth gearwheel 15, which are arranged to rotate about a further rotational axis 20. The further rotation axis is associated for example with a main transmission shaft (not shown) and extends parallel to the rotation axis 6 of the transmission shaft 5. In this example embodiment the transmission shaft 5 is a countershaft to the main transmission shaft. The first gearwheel 3 of the countershaft meshes with the third gearwheel 14 of the main transmission shaft and the second gearwheel 4 of the countershaft meshes with the fourth gearwheel 15.

Between the gearwheels 14 and 15 on the main transmission shaft, which are loose wheels, is arranged a shifting unit 16 by means of which the power flow can be directed optionally by way of the first gearwheel 3 and the third gearwheel 14 or by way of the second gearwheel 4 and the fourth gearwheel 15 on the main transmission shaft. The shifting unit 16 is arranged in an intermediate space between the gearwheels 3, 4, 14 and 15, so that the fitting space available is used in an optimum manner.

Figure 2:
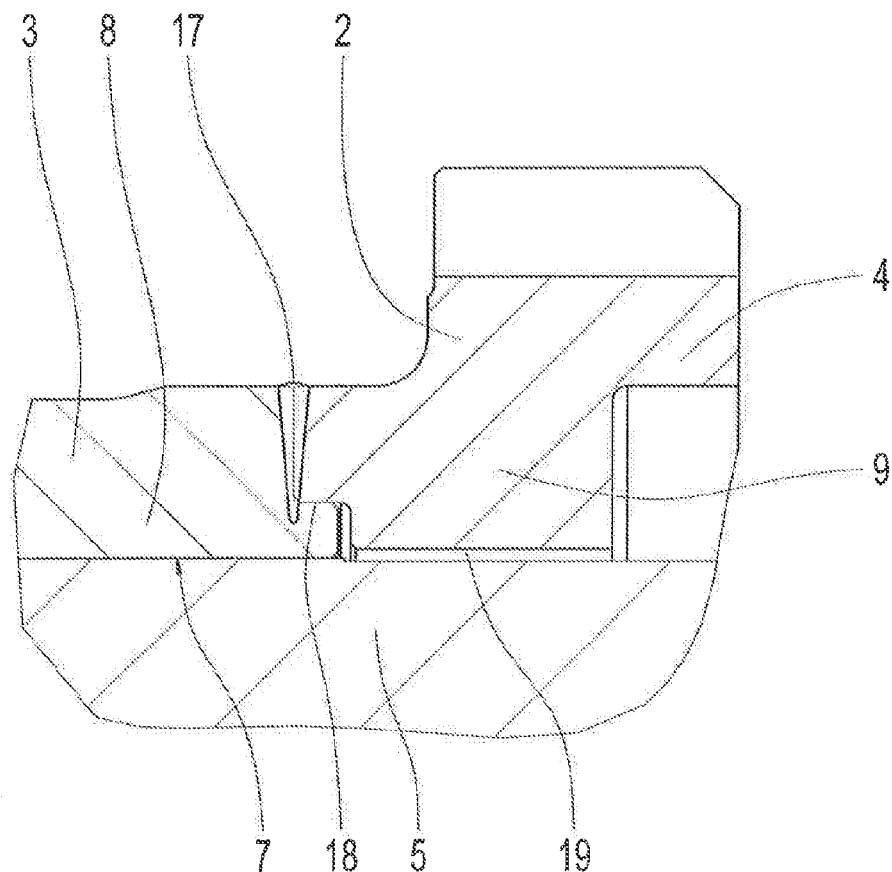
FIG. 2: An enlarged section of FIG. 1.

FIG. 2 shows an enlarged section of FIG. 1, in which, in particular, the fixing of the second gearwheel 4 over the first gearwheel 3 on the transmission shaft 5 can be seen more clearly.

At its end facing toward the first gearwheel 3, the hub 9 of the second gearwheel 4 is welded to the hub 8 of the first gearwheel 3. In addition to the weld seam 17 which joins the two hubs 8 and 9 to one another in a material-merged way, a further shrink or press fit 18 is formed between the two gearwheels 3 and 4. This further shrink or press fit 18 serves in particular to ensure the precise positioning of the two gearwheels 3 and 4 relative to one another, and to further strengthen the connections between the two gearwheels 3 and 4.

In FIG. 2 it can be seen clearly that there is no contact between the second gearwheel 4 and the transmission shaft 5. Instead, between the inside circumferential surface of the hub 9 of the second gearwheel 4 and the outer circumferential surface of the transmission shaft 5 there is an air gap 19.

INDEXES

1 Transmission shaft arrangement
2 Double gearwheel
3 First gearwheel
4 Second gearwheel
5 Transmission shaft
6 Rotational axis
7 Shrink fit
8 Hub
9 Hub
10 Dowel pin
11 Bore
12 Blind bore
13 Roller bearing
14 Third gearwheel
15 Fourth gearwheel
16 Shifting unit
17 Weld seam
18 Further shrink fit
19 Air gap
20 Further rotational axis

The invention claimed is:

1. A shaft-hub connection of a double gearwheel on a transmission shaft, the double gearwheel comprising:
a first gearwheel and a second gearwheel being directly connected to one another by a rotationally fixed connection such that the first and the second gearwheels rotate in unison with one another,
the first gearwheel is connected to the transmission shaft by the shaft-hub connection being in a form of a shrink fit between a hub of the first gearwheel and the transmission shaft such that the second gearwheel is only connected to the transmission shaft by the first gearwheel and an annular gap separating and spacing a hub of the second gearwheel from the transmission shaft, without any component located within the annular gap, and
torque to be transmitted being transmittable, between the hub of the first gearwheel and the transmission shaft, by virtue of the shrink fit.

2. The shaft-hub connection according to claim 1, wherein the rotationally fixed connection between the first gearwheel and the second gearwheel is one of a positive locking connection, a friction-force locking connection and a materially-merged connection.

3. The shaft-hub connection according to claim 1, wherein the hub of the second gearwheel is arranged, in an axial direction, adjacent the hub of the first gearwheel.

4. The shaft-hub connection according to claim 3, wherein ends of the hub of the first gearwheel and the hub of the second gearwheel, facing toward one another, are both welded to one another and have one of a shrink or press fit which ensure precise positioning of the first and the second gearwheels relative to one another and further strengthens a connection between the first and the second gearwheels.

5. The shaft-hub connection according to claim 1, wherein a positive-locking element is provided, in an area of the shrink fit, in order to prevent micro-displacement.

6. The shaft-hub connection according to claim 5, wherein the positive-locking element is a dowel pin.

7. A transmission shaft arrangement with at least a first gearwheel and a second gearwheel, the first gearwheel and the second gearwheel being fixed on the transmission shaft by a shaft-hub connection,
the first gearwheel and the second gearwheel being connected to one another by a rotationally fixed connection such that the first and the second gearwheels rotate in unison with one another, and the shaft-hub connection being in a form of a shrink fit between a hub of the first gearwheel and the transmission shaft, a hub of the second gearwheel being radially free and spaced from the transmission shaft by an annular gap without any component located within the annular gap, and torque to be transmitted by the first gearwheel being transmittable from the transmission shaft to the first gearwheel by virtue of the shrink fit, and torque to be transmitted by the second gearwheel only being transmitted to the second gearwheel by both the shrink fit and the rotationally fixed connection.

8. A gearwheel-transmission shaft arrangement, the arrangement comprising:

a double gearwheel having first and second gearwheels being connected to a transmission shaft, the first gearwheel having a hub comprising an axial first end that is directly connected to a hub of the second gearwheel by a rotationally fixed connection which comprises a materially-bonded connection such that the first and the second gearwheels rotate in unison with one another, and an annular gap separating and spacing the hub of the second gearwheel from the transmission shaft, without any component located within the annular gap, and the hub of the first gearwheel being connected, via a shrink-fit connection, to the transmission shaft such that torque is transmittable between the transmission shaft and the first gearwheel via the shrink-fit connection, and torque to be transmitted by the second gearwheel being transmitted to the second gearwheel by both the shrink fit and the rotationally fixed connection.

9. The arrangement according to claim 8, wherein the hub of the first gearwheel has an axial extension that extends axially from the first end surface, and the axial extension of the hub of the first gearwheel is received within the hub of the second gearwheel, and the hub of the second gearwheel is connected to the axial extension of the hub of the first gearwheel by either a shrink fit or a press fit, and the first end surface of the hub of the first gearwheel is connected to the hub of the second gearwheel by a weld which forms the rotationally fixed connection and the hub of the second gearwheel is radially spaced from the transmission shaft by the annular gap.

10. The arrangement according to claim 8, wherein the hub of the first gearwheel comprises a through bore and the transmission shaft comprises a blind bore and a positive-locking element extends from the through bore of the first gearwheel into the blind bore of the transmission shaft to prevent relative rotational micro-displacement between the hub of the first gearwheel and the transmission shaft.

11. The arrangement according to claim 10, wherein the positive-locking element is a dowel pin.

* * * * *